(12) United States Patent
Cho et al.

(10) Patent No.: US 11,308,847 B2
(45) Date of Patent: *Apr. 19, 2022

(54) DISPLAY APPARATUS AND DRIVING METHOD THEREOF

(71) Applicant: SAMSUNG ELECTRONICS CO., LTD., Suwon-si (KR)

(72) Inventors: Seong-phil Cho, Seoul (KR); Jin-mo Kang, Suwon-si (KR); Sang-young Park, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/895,558

(22) Filed: Jun. 8, 2020

(65) Prior Publication Data

US 2020/0302852 A1   Sep. 24, 2020

Related U.S. Application Data

(63) Continuation of application No. 16/564,690, filed on Sep. 9, 2019, now Pat. No. 10,713,994, which is a
(Continued)

(30) Foreign Application Priority Data

Aug. 26, 2016   (KR) .................. 10-2016-0109483

(51) Int. Cl.
*G09G 3/20* (2006.01)
*G06F 3/14* (2006.01)
(Continued)

(52) U.S. Cl.
CPC .......... *G09G 3/2003* (2013.01); *G06F 3/1446* (2013.01); *G09G 3/3666* (2013.01);
(Continued)

(58) Field of Classification Search
CPC ...... G06F 3/1446; G09G 3/3208; H01L 51/50
See application file for complete search history.

(56) References Cited

U.S. PATENT DOCUMENTS 7,119,493 B2   10/2006   Fryer et al.
7,502,950 B1    3/2009   Brands
(Continued)

FOREIGN PATENT DOCUMENTS

CN   1856814 A   11/2006
CN   101030345 A   9/2007
(Continued)

OTHER PUBLICATIONS

Communication dated Feb. 12, 2019, issued by the European Patent Office in counterpart European Application No. 17843957.6.
(Continued)

*Primary Examiner* — Sepehr Azari
(74) *Attorney, Agent, or Firm* — Sughrue Mion, PLLC

(57) ABSTRACT

A display apparatus includes a display including a plurality of display modules, a display driver including a plurality of driving modules respectively connected to the plurality of display modules, a storage storing current information concerning a plurality of display modules, and a processor calculating a peak luminance level of each of a plurality of display modules based on individual power consumptions of each of a plurality of display modules and controlling a plurality of driving modules using the current information stored in the storage based on the calculated peak luminance level.

19 Claims, 13 Drawing Sheets

Related U.S. Application Data continuation of application No. 15/434,190, filed on Feb. 16, 2017, now Pat. No. 10,431,138.

(51) Int. Cl.
  *G09G 3/36* (2006.01)
  *G09G 3/32* (2016.01)

(52) U.S. Cl.
  CPC ......... *G09G 3/32* (2013.01); *G09G 2300/026* (2013.01); *G09G 2300/0452* (2013.01); *G09G 2320/0233* (2013.01); *G09G 2320/0242* (2013.01); *G09G 2320/0633* (2013.01); *G09G 2320/0666* (2013.01); *G09G 2330/025* (2013.01); *G09G 2360/16* (2013.01)

(56) References Cited

U.S. PATENT DOCUMENTS

| | | |
|---|---|---|
| 7,834,824 B2 | 11/2010 | Routley et al. |
| 8,325,115 B2 | 12/2012 | Tada et al. |
| 8,797,368 B2 | 8/2014 | Yoo et al. |
| 8,902,132 B2 | 12/2014 | Ozawa et al. |
| 8,963,800 B2 | 2/2015 | Murai et al. |
| 9,123,295 B2 | 9/2015 | Jeong |
| 9,159,272 B2 | 10/2015 | Murai et al. |
| 9,214,108 B2 | 12/2015 | Tada et al. |
| 9,378,682 B2 | 6/2016 | Lim et al. |
| 2005/0017650 A1 | 1/2005 | Fryer et al. |
| 2005/0017922 A1* | 1/2005 | Devos ............... G09G 3/3216 345/6 |
| 2006/0038758 A1 | 2/2006 | Routley et al. |
| 2006/0119546 A1 | 6/2006 | Otsuka et al. |
| 2006/0227085 A1 | 10/2006 | Boldt, Jr. et al. |
| 2007/0002004 A1 | 1/2007 | Woo |
| 2007/0126672 A1* | 6/2007 | Tada ............... G09G 3/3233 345/77 |
| 2007/0139406 A1 | 6/2007 | Ozawa et al. |
| 2008/0018640 A1 | 1/2008 | Tada et al. |
| 2008/0062208 A1 | 3/2008 | Tada et al. |
| 2009/0153537 A1 | 6/2009 | Tada et al. |
| 2010/0002022 A1 | 1/2010 | Tobita et al. |
| 2010/0007588 A1* | 1/2010 | Zygmunt ............... G09G 3/30 345/83 |
| 2010/0156297 A1 | 6/2010 | Jeong et al. |
| 2011/0157262 A1 | 6/2011 | Fujiwara et al. |
| 2011/0298763 A1* | 12/2011 | Mahajan ............... G09F 9/3026 345/207 |
| 2011/0298843 A1 | 12/2011 | Hajjar et al. |
| 2012/0025716 A1 | 2/2012 | Nakanishi et al. |
| 2012/0026211 A1 | 2/2012 | Kikuchi et al. |
| 2012/0299979 A1 | 11/2012 | Murai et al. |
| 2012/0320105 A1 | 12/2012 | Ueno et al. |
| 2013/0050292 A1* | 2/2013 | Mizukoshi ............ G09G 3/3291 345/690 |
| 2013/0050295 A1 | 2/2013 | Tada et al. |
| 2013/0314458 A1* | 11/2013 | Murai ................. G09G 3/3426 345/691 |
| 2014/0043369 A1 | 2/2014 | Albrecht et al. |
| 2014/0139115 A1 | 5/2014 | Kikkawa et al. |
| 2014/0152704 A1* | 6/2014 | Jeong ................ G09G 3/3233 345/690 |
| 2014/0225933 A1* | 8/2014 | Park ........................ G09G 5/10 345/690 |
| 2014/0320546 A1 | 10/2014 | Lim et al. |
| 2014/0340437 A1* | 11/2014 | Kohashikawa ...... G09G 3/3426 345/694 |
| 2015/0097872 A1 | 4/2015 | Jeong et al. |
| 2015/0123955 A1 | 5/2015 | Bi et al. |
| 2015/0243211 A1 | 8/2015 | Pyo |
| 2016/0019834 A1* | 1/2016 | Hall ........................ G06F 1/20 345/212 |
| 2016/0035317 A1 | 2/2016 | Imai et al. |
| 2016/0041805 A1 | 2/2016 | Joo et al. |
| 2016/0104444 A1* | 4/2016 | Miyata ................. G09G 3/3413 345/205 |
| 2016/0240140 A1* | 8/2016 | Park ..................... G09G 3/3258 |
| 2018/0061298 A1* | 3/2018 | Cho ...................... G06F 3/1446 |

FOREIGN PATENT DOCUMENTS

| | | |
|---|---|---|
| CN | 101030346 A | 9/2007 |
| CN | 103854599 A | 6/2014 |
| CN | 104134422 A | 11/2014 |
| CN | 104332151 A | 2/2015 |
| JP | 2005-530200 A | 10/2005 |
| JP | 2006-528788 A | 12/2006 |
| JP | 2007-298778 A | 11/2007 |
| JP | 2010-527043 A | 8/2010 |
| JP | 2014-102484 A | 6/2014 |
| KR | 10-0698126 B1 | 3/2007 |
| KR | 10-1104074 B1 | 1/2012 |
| KR | 10-2015-0041485 A | 4/2015 |
| WO | 2005013248 A1 | 2/2005 |
| WO | 2008142602 A2 | 11/2008 |
| WO | 2011104952 A1 | 9/2011 |
| WO | 2012108337 A1 | 8/2012 |

OTHER PUBLICATIONS

Communication dated Jan. 28, 2020, from the Japanese Patent Office in counterpart application No. 2019-510305.
Communication issued by the International Searching Authority dated Nov. 24, 2017 in counterpart International Application No. PCT/KR2017/009222 (PCT/ISA/210 & PCT/ISA/237).
Communication issued by the Korean Intellectual Property Office dated Nov. 2, 2017 in counterpart Korean Patent Application No. 10-2016-0109483.
Communication dated Jul. 21, 2020 by the Japanese Patent Office in counterpart Japanese Patent Application No. 2019-510305.
Communication dated Jan. 28, 2021 by Intellectual Property India in Indian Application No. 201947010379.
Communication dated May 19, 2021 issued by the National Intellectual Property Administration of the P.R.China in Chinese Application No. 201780052327.5.

* cited by examiner

DISPLAY APPARATUS AND DRIVING METHOD THEREOF

CROSS-REFERENCE TO RELATED APPLICATIONS

This application is a Continuation Application of U.S. application Ser. No. 16/564,690, filed Sep. 9, 2019, which is a Continuation Application of U.S. application Ser. No. 15/434,190, filed Feb. 16, 2017, which claims priority from Korean Patent Application No. 10-2016-0109483, filed on Aug. 26, 2016 in the Korean Intellectual Property Office, the disclosures of which are incorporated herein by reference in their entireties.

BACKGROUND

1. Field

Devices and methods consistent with exemplary embodiments relate to a display apparatus and a driving method thereof, and more specifically, to a display apparatus provided with a display configured with a spontaneous emission pixels that are driven by electric currents and a driving method thereof.

2. Description of Related Art

A light emitting diode (LED) is a semiconductor emitting device for converting electric currents into light. Recently, as luminance of LED gradually increases, LED devices are increasingly used as a display light source, automobile light source and illumination light source. Further, LEDs that emit white light with excellent efficiency can also be implemented by using a fluorescent material or combining various colors of LEDs.

Such LED can display an image with high luminance with a high current. However, LEDs driven at such high currents have a problem of related to a color shift phenomenon.

Specifically, red, blue and green LEDs, necessary for implementing various colors, have a problem of screen quality deterioration when the currents increase because different color shift phenomenon occurs according to increase of the applied currents.

SUMMARY

Exemplary embodiments may overcome the above disadvantages and other disadvantages not described above. Also, exemplary embodiments are not required to overcome the disadvantages described above, and an exemplary embodiment may not overcome any of the problems described above.

According to an aspect of an exemplary embodiment, there is provided a display apparatus including: a display including a plurality of display modules; a display driver including a plurality of driving modules respectively connected to the plurality of display modules; a storage configured to store current information concerning the plurality of display modules; and a processor configured to calculate a peak luminance level of each of the plurality of display modules based on individual power consumptions of each of the plurality of display modules, and control the plurality of driving modules using on the current information stored in the storage based on the calculated peak luminance level.

Each of the plurality of display modules may include sub pixels, and the current information may include current control information according to luminance of each sub pixel of the plurality of display modules.

The current control information may be calibrated based on a luminance characteristic and a color shift characteristic according to a plurality of current levels of each sub pixel of the plurality of display modules.

The processor may be further configured to obtain, from the storage, a current gain value of each sub pixel of the plurality of display modules, and control a driving state of each of the plurality of driving modules based on the obtained current gain values to reach the respective calculated peak luminance levels.

The processor may be further configured to calculate a peak luminance level of each of the plurality of display modules based on: a maximum power consumption among the individual power consumptions of each of the plurality of display modules; and a rated capacity of each of the plurality of driving modules.

The storage may further store luminance level information of a plurality of power levels provided to each of the plurality of display modules, and the processor may be further configured to determine a reference display module of the plurality of display modules, the reference display module consuming more power than remaining display modules of the plurality of display modules, determine a power increase of the reference display module, determine a corresponding power increase of each remaining display module based on a power increase of the reference display module, and calculate a peak luminance level of each display module based on a maximum power amount calculated for each display module and the luminance level information of each of the plurality of power levels.

The storage may further store the luminance level information of a plurality of power levels provided to each of the plurality of the display modules, and the processor may be further configured to determine a reference display module of the plurality of display modules, the reference display module consuming more power than remaining display modules of the plurality of display modules, calculate a reference peak luminance level of the reference display module based on maximum luminance level information of each of the plurality of power levels, and calculate a peak luminance level of each of the remaining display modules based on the calculated reference peak luminance level.

The storage may further store power information of each sub pixel per gray scale of an image, and the processor may be further configured to calculate a power consumption of each of the plurality of display modules based on a gray scale value of an image displayed on each of the plurality of display modules and the power information of each sub pixel per gray scale.

Each of the plurality of display modules may include an LED cabinet including a plurality of LED devices, and the current information may include current information corresponding to each of a red LED, a green LED and a blue LED.

According to an aspect of another exemplary embodiment, there is provided a method of driving a display apparatus including a plurality of display modules respectively connected to a plurality of driving modules, the method including: calculating a peak luminance level of each of the plurality of display modules based on individual power consumptions of each of the plurality of display modules; and driving the plurality of display modules using current information corresponding to each of the plurality of display modules based on the calculated peak luminance level.

Each of the plurality of display modules includes sub pixels, and the current information may include current control information according to luminance of each sub pixel of the plurality of display modules.

The current control information may be calibrated based on a luminance characteristic and a color shift characteristic according to a plurality of current levels of each sub pixel of the plurality of display modules.

The driving the plurality of display modules may include: obtaining a current gain value of each sub pixel of the plurality of display modules; and driving the plurality of display modules based on the obtained current gain value. to reach the respective calculated peak luminance levels.

The calculating the peak luminance level may include calculating a peak luminance level of each of the plurality of display modules based on: a maximum power consumption among the individual power consumptions of each of the plurality of display modules; and a rated capacity of each of the plurality of driving modules.

The calculating the peak luminance level may include: determining a reference display module of the plurality of display modules, the reference display module consuming more power than remaining display modules of the plurality of display modules; determining a corresponding power increase of each remaining display module based on a power increase of the reference display module; and calculating a peak luminance level of each display module based on luminance level information of each of the plurality of power levels and a maximum power amount calculated for each display module.

The calculating the peak luminance level may include: determining a reference display module of the plurality of display modules, the reference display module consuming more power than remaining display modules of the plurality of display modules; calculating a reference peak luminance level of the reference display module based on maximum luminance level information of each of the plurality of power levels; and calculating a peak luminance level of each of the remaining display modules based on the calculated reference peak luminance level.

The calculating the peak luminance level may include calculating the power consumption of each of the plurality of display modules based on power information of each sub pixel per gray scale of an image and a gray scale value of an image displayed on each of the plurality of display modules.

Each of the plurality of display modules may include an LED cabinet including a plurality of LED devices, and the current information may include current information corresponding to each of a red LED, a green LED and a blue LED.

According to an aspect of yet another exemplary embodiment, there is provided a display apparatus including: a plurality of display modules; a plurality of driving modules configured to respectively drive the plurality of display modules; and a processor configured to control the plurality of driving modules to display an image on the plurality of display modules, determine a high power driving module among the plurality of driving modules based on power required by each of the plurality of driving modules to display the image, determine a power increase based on power consumed by the high power driving module and a power capacity of the high power driving module, and drive another driving module of the plurality of driving modules based on the power increase.

The processor may be further configured to determine the power increase by dividing the power capacity by power required by the high power driving module to display the image, and apply power to the another driving module at an increased level corresponding to an initial power consumption of the another driving module multiplied by the power increase rate.

The processor may be further configured to determine the power increase based on a difference between power required by the high power driving module to display the image and the power capacity, and apply power to the another driving module at an increased level corresponding to a sum of an initial power consumption of the another driving module and the power increased multiplied by a weighted value corresponding to the another driving module.

BRIEF DESCRIPTION OF THE DRAWINGS

The above and/or other aspects will be more apparent by describing certain exemplary embodiments with reference to the accompanying drawings, in which.

DETAILED DESCRIPTION OF EXEMPLARY EMBODIMENTS

Figure 1:
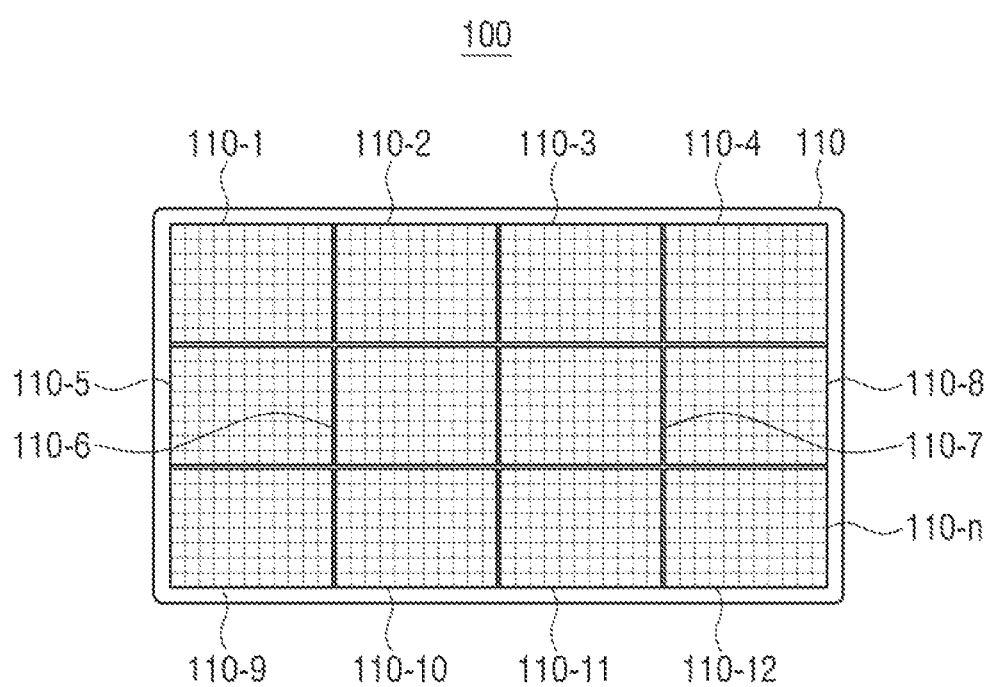
FIG. 1 is a diagram illustrating a display apparatus according to an exemplary embodiment.

Exemplary embodiments will now be described in greater detail with reference to the accompanying drawings.

In the following description, same drawing reference numerals are used for the same elements even in different drawings. The matters defined in the description, such as detailed construction and elements, are provided to assist in a comprehensive understanding, and exemplary embodiments can be carried out without those specifically defined matters. Also, well-known functions or constructions are not described in detail for conciseness.

FIG. 1 is a diagram illustrating a display apparatus according to an exemplary embodiment.

Referring to FIG. 1, a display apparatus 100 according to an exemplary embodiment may be implemented by physically connecting a plurality of display modules 110-1, 110-2, 110-3, 110-4, . . . 110-12. Herein, each of the plurality of display modules may include a plurality of pixels arranged in a matrix form. The pixels may be, for example, spontaneous emission pixels. Specifically, the display modules may be an LED module in which each of a plurality of pixels is an LED pixel, or an LED cabinet in which a plurality of LED modules are connected. However, these are examples, and exemplary embodiments are not limited to the above. For example, the display module may be implemented as a liquid crystal display (LCD), an organic LED (OLED), an active-matrix OLED (AMOLED), or a plasma display panel (PDP). However, exemplary embodiments will be described below based on assumption that each of the display modules is implemented as an LED cabinet for convenient explanation.

An LED is an optical semiconductor device that converts electrical energy into light energy. Further, an LED is one type of a p-n junction diode, and while generating light, electrons of an n region moves to a p region with current provided externally, electrons and electron holes are recombined at a junction, and electrons are reverted to a ground state, resulting in emission of an energy, i.e., a light. A wavelength of the emitting light may be formed in various shapes according to an energy band value, and light colors may be determined according to the wavelength. Further, an LED is a current driving device in which luminance may be vary according to the applied current, and each color, red, green and blue, may have a different resistance value. Therefore, because each applied electrical power may be different when the same current and voltage are applied, there may be a difference in luminance per LED. Further, an LED may experience a color shift phenomenon according to increase of the applied current, and may have different color shift values depending on the LED color.

Therefore, when current values increase en bloc to implement a high luminance on an LED display, screen quality deterioration may occur due to the luminance variation and the color shift phenomenon. Below, various LED driving methods consistent with one or more exemplary embodiments are discussed that can prevent screen quality deterioration due to such LED characteristics.

Figure 2A:
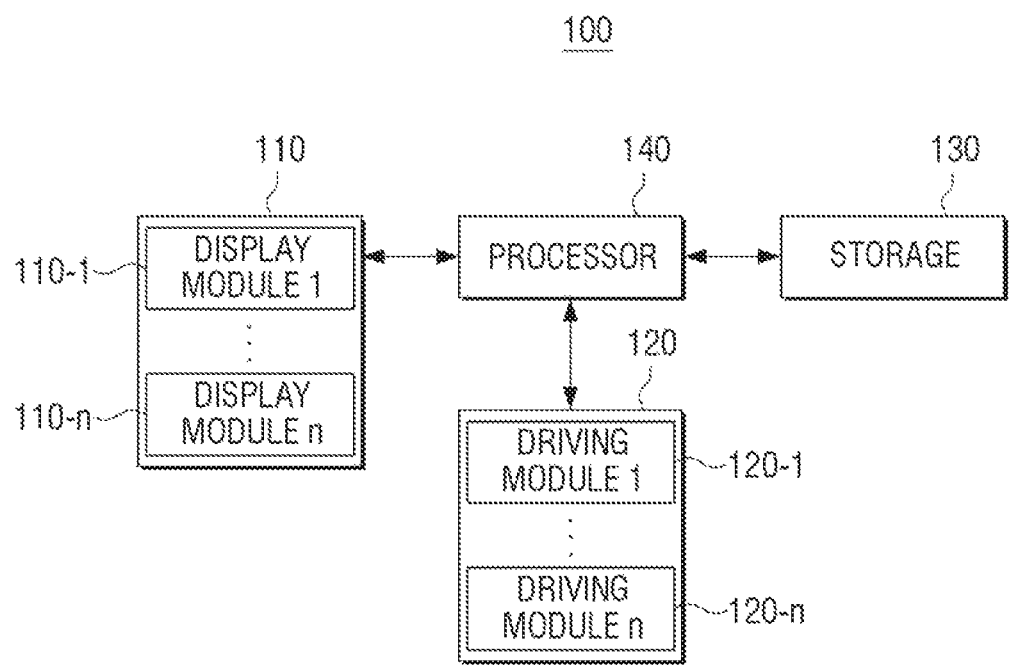
FIGS. 2A and 2B are a block diagrams illustrating a display apparatus according to an exemplary embodiment.

FIG. 2A is a block diagram illustrating a display apparatus according to an exemplary embodiment.

Referring to FIG. 2A, the display apparatus 100 includes the display 110, a display driver 120 and a storage 130.

The display 110 may include a plurality of display modules. Specifically, the display 110 may be configured in such a form in which a plurality of display modules 110-1, ..., 110-n are connected and assembled. Herein, each of a plurality of display modules may include a plurality of pixels arranged in a matrix form, and the plurality of pixels may be spontaneous emission pixels. According to an exemplary embodiment, the display 110 may be implemented to include a plurality of LED modules, each LED module including at least one LED device, and/or a plurality of LED cabinets. Further, LED modules may include a plurality of LED pixels; according to an exemplary embodiment, LED pixels may be implemented as LEDs, including a red LED, a green LED, and a blue LED.

The display driver 120 may drive the display 110 according to control of a processor 140. For example, the display driver 120 may apply a driving voltage or have a driving current to flow in order to drive each spontaneous emission device constituting the display panel 110, e.g., drive LED pixel, according to control of the processor 140.

The display driver 120 may include a plurality of LED driving modules 120-1, ..., 120-n respectively connected to a plurality of display modules 110-1, ..., 110-n. A plurality of LED driving modules 120-1, ..., 120-n may drive a plurality of display modules 110-1, ..., 110-n by providing the driving current to a plurality of display modules 110-1, ..., 110-n correspondingly to each control signal inputted from the processor 140 which will be described below.

Specifically, a plurality of LED driving modules 120-1, ..., 120-n may adjust and output supply time or intensity of the driving current provided to a plurality of display modules 110-1, ..., 110-n according to each control signal inputted from the processor 140.

Each of a plurality of LED driving modules 120-1, ..., 120-n may include a power supply for providing electrical power. The power supply is hardware for converting alternating current into the direct current and providing the electrical power to be suitable for each system. The power supply may be include an input electromagnetic interference (EMI) filter, an alternating-direct rectifier, a direct-direct switching converter, an output filter, and an outputter. The power supply may be a switched mode power supply (SMPS), for example. An SMPS may be a direct stabilization electrical power device stabilized with the output by on-off time ratio control of a semiconductor switch device, which may provide high efficiency, miniaturization, and light-weight and thus be used in driving each of a plurality of display modules 110-1, ..., 110-n.

However, according to another exemplary embodiment, the display driver 120 may be implemented as one driving module which separately drives a plurality of SMPS for providing the electrical power to each of a plurality of display modules 110-1, ..., 110-n.

According to various exemplary embodiments, a plurality of display modules 110-1, ..., 110-n may respectively include a sub processor for controlling operation of each display module and a driving module for driving each display module according to control of the sub processor. In this case, the sub processor and the driving module may be hardware, software, firmware or an integrated chip (IC). According to an exemplary embodiment, each sub processor may be implemented as a separate semiconductor IC.

The storage 130 may store various data necessary for operation of the display apparatus 100.

The storage 130 may be a non-volatile memory, volatile memory, hard disk drive (HDD), or solid state drive (SSD), a memory card attached with the display apparatus 100 (e.g., micro SD card, USB memory), and an external memory that can be connected with an external input port (e.g., USB memory).

Specifically, the storage 130 may store current information of a plurality of display modules 110-1, ..., 110-n. Herein, the current information may be current control information according to luminance of each sub pixel constituting the display module. The current control information according to luminance of each sub pixel may be calibrated (modeled) based on luminance characteristics and color shift characteristics according to the current of each sub pixel.

Specifically, the current control information according to luminance of each sub pixel may be current gain information according to luminance of each sub pixel, which is calibrated based on luminance level information according to the current of each sub pixel and color shift information according to the current of each sub pixel. For example, the luminance level information according to the current of each sub pixel may be luminance change information according to the current change of each R/B/G LED device, and the color information according to the current of each sub pixel may be degrees of variations of the color coordinates (e.g., x, y color coordinates) according to the current change of each R/B/G LED device.

In this case, the current gain information according to luminance of each sub pixel may be obtained by calibrating current values so that luminance change of each R/B/G LED device according to the current change is similar, and by calibrating current values so that the color shift phenomenon of each R/B/G LED device is not generated according to the current change.

However, exemplary embodiments are not be limited to the examples provided above. According to one or more exemplary embodiments, the current control information may be current values instead of current gain values.

Further, the storage 130 may store luminance level information of each power level provided to the display module. Luminance of the display module increases as power provided to the display module increases. However, when the power supplied exceeds a preset threshold value, a luminance increase rate of the display module may gradually decrease, and may not increase by more than a maximum luminance value. Accordingly, information regarding luminance change of the display module according to the supply power change may be previously measured and stored in the storage 130.

In this case, the luminance level information of each power may be luminance increase information according to power increase. However, even when the above form of information is not provided, any information representing relations between the power supply and luminance may be applied without limitations.

Further, the storage 130 may store power information of each sub pixel per gray scale. Because the gray scale of an image is related to a luminance value, power of each LED device necessary for expressing a preset gray scale of an image may change. As a result, the power information of each LED device per gray scale of an image may be stored in the storage 130.

For example, in case of 255 gray scale value (when an image has 256 steps of gray scale regarding each color signal of red, green and blue) or 1024 gray scale value (when an image has 1024 steps of gray scale regarding each color signal of red, green and blue), the power information of each LED device per gray scale may be stored in the storage 130. Such power information of each gray scale may be previously measured and stored in the storage 130. Thus, while an image of each gray scale is respectively displayed on the display module, the power information of each gray scale may be obtained by measuring an amount of power consumed in LED device.

Besides, the storage 130 may store information regarding binning group, information regarding maximum luminance of each pixel, information regarding color of each pixel, and a luminance correction coefficient of each pixel. Herein, the binning group may be LED pixel group having maximum uniform characteristics (luminance, color coordinate) with respect to LED pixels.

For example, in order to adjust maximum luminance to a target luminance for uniformity between a plurality of LED pixels, the luminance may be lowered through the calibration by using a luminance correction coefficient. In this case, the luminance correction coefficient may be in a 3*3 matrix form to implement the target red, green and blue luminance, the maximum luminance may be a target luminance obtained by applying different luminance correction coefficients to each pixel, thereby implementing uniformity. Further, while implementing the target luminance in a 3*3 matrix form of parameters corresponding to each LED element, a color temperature may be also calibrated to obtain uniformity.

Further, the storage 130 may store information regarding a number of pixels constituting each of a plurality of display modules, a size of the pixels and an internal distance between the pixels.

Meanwhile, according to another exemplary embodiment, the above described information stored in the storage 130 may be obtained from an external device. For example, a portion of the information may be received in real time from an external device such as set-top box, external server, and user terminal.

The processor 140 may control overall operation of the display apparatus 100. The processor 140 may include one or more among a central processing unit (CPU), a controller, an application processor (AP), a communication processor (CP), and an ARM processor.

Further, the processor 140 may include a graphic processing unit for graphic processing corresponding to an image. The processor 130 may be implemented as a system on chip (SoC) including a core and a GPU. The processor 130 may include a single core, a dual core, a triple core, a quad core and a multiple number of a core.

According to an exemplary embodiment, the processor 140 may calculate a peak luminance level of each of a plurality of display modules 110-1, . . . , 110-n based on a calculated individual power consumptions with respect to each of a plurality of display modules 110-1, . . . , 110-n. Thereafter, the processor 140 may control each of a plurality of driving modules 120-1, . . . , 120-n to have peak luminance levels respectively corresponding to a plurality of display modules 110-1, . . . , 110-n based on the current information of each luminance stored in the storage 130.

In this case, the processor 140 may calculate an amount of power consumed in each of a plurality of display modules 110-1, . . . , 110-n based on gray scale values of images displayed on each of a plurality of display modules 110-1, . . . , 110-n and the power information of each sub pixel per gray scale obtained from the storage 130.

Figure 2B:
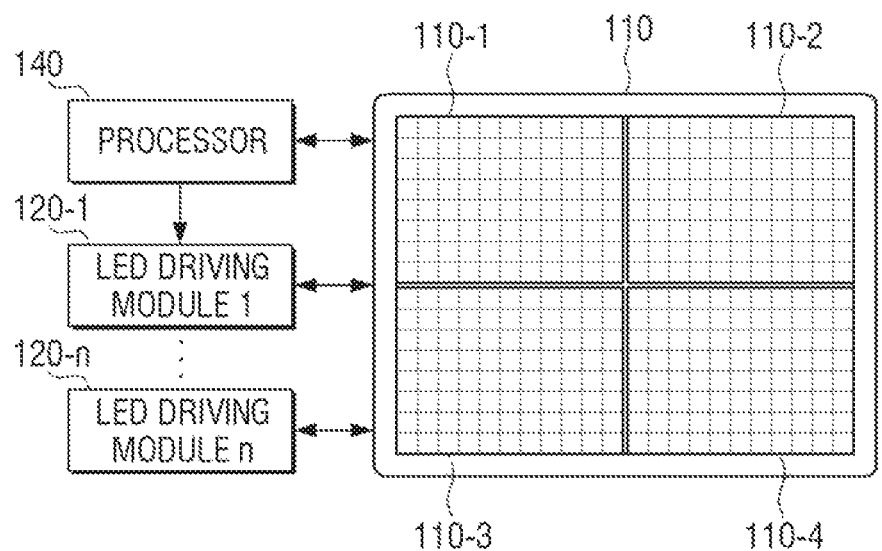

For example, as illustrated in FIG. 2B, it is assumed that a plurality of display modules 110-1, . . . , 110-n may be implemented as the first to fourth display modules 110-1 to 110-4, and may be respectively driven by the first to fourth driving modules 110-1 to 110-4.

Figure 3A:
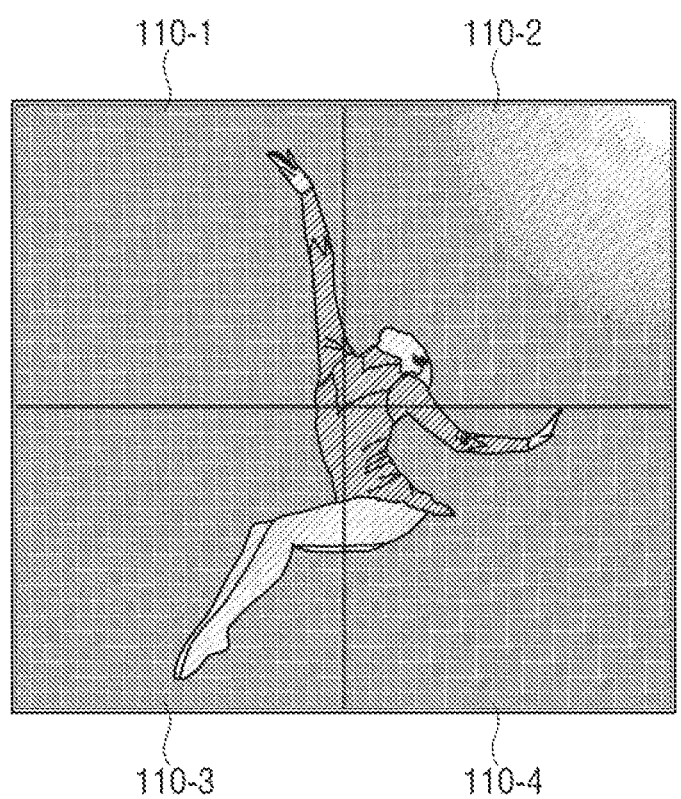
FIGS. 3A and 3B are diagrams describing a method for calculating power consumption of each display module according to an exemplary embodiment.

In this case, as illustrated in FIG. 3A, one image frame may be divided over the first to fourth display modules 110-1 to 110-4 and displayed. In this case, the gray scales corresponding to each of first to fourth image regions provided to the first to fourth display modules 110-1 to 110-4 may be generally different. When one image frame is divided into a plurality of image regions, images respectively included in the divided image regions may be each different.

The processor 140 may calculate an amount of power consumed in the first to fourth display modules 110-1 to 110-4 based on the image gray scale values to be expressed by each sub pixel while the first to fourth display modules 110-1 to 110-4 display the first to fourth image regions. In this case, the processor 140 may calculate an amount of power consumed in the first to fourth display modules 110-1 to 110-4 based on the power information of each LED device per gray scale stored in the storage 130.

Figure 4:
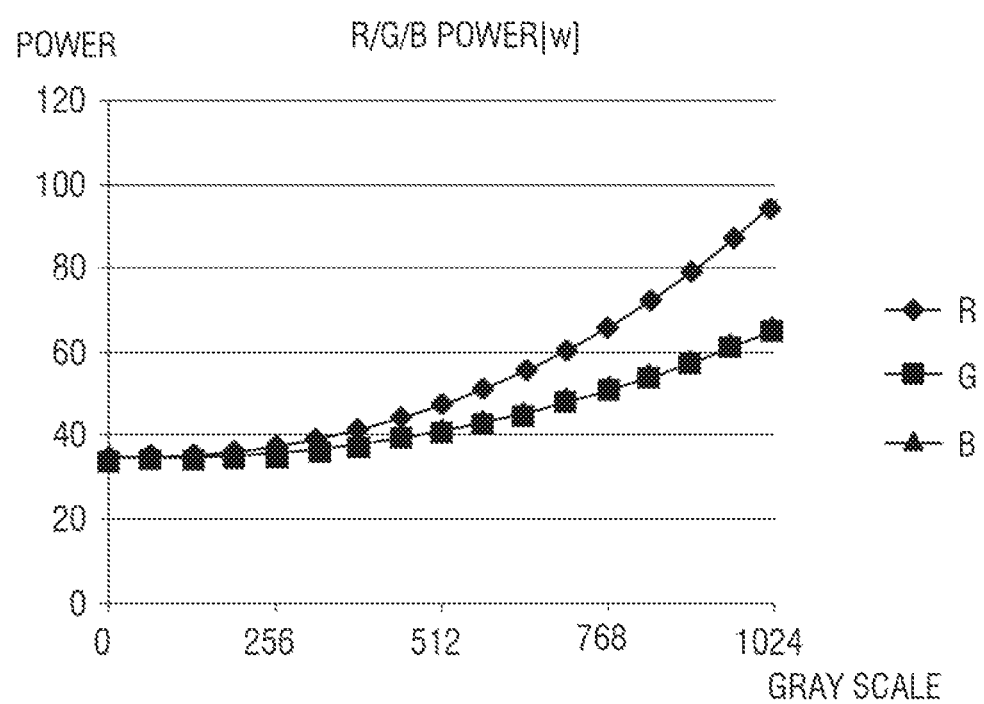
FIG. 4 is a diagram illustrating power information of each sub pixel per gray scale of an image according to an exemplary embodiment.

FIG. 4 is a diagram illustrating the power information of each sub pixel per gray scale of an image according to an exemplary embodiment.

For example, as illustrated in FIG. 4, when each LED device expresses each gray scale value of 1024 gray scale, the consumed amount of power may be different. Generally, in case of a red LED device, the necessary power for expressing a uniform gray scale value is relatively greater compared to a green LED device and a blue LED device, whereas the green LED device and the blue LED device require a similar amount of power to express a uniform gray scale value.

The power values necessary for expressing the gray scale of an image per LED device may be previously stored in the storage 130, and the processor 140 may calculate individual power consumptions of each of the first to fourth display modules 110-1 to 110-4 based on the previously stored information.

Figure 3B:
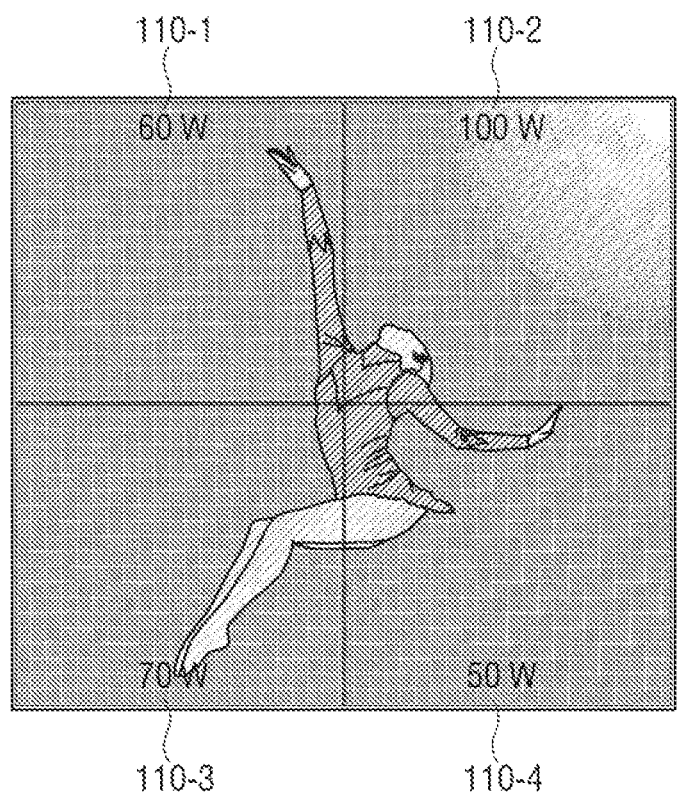

For example, as illustrated in FIG. 3B, the power consumption of the first to fourth display modules 110-1 to 110-4 may be calculated to be 60 watts (W), 100 W, 70 W, 50 W, respectively.

Thereafter, the processor 140 may calculate a peak luminance level of each of a plurality of display modules 110-1, ..., 110-n based on individual power consumptions calculated with respect to each of a plurality of display modules 110-1, ..., 110-n and a capacity that can be provided by a plurality of driving modules 120-1, ..., 120-n. Herein, a capacity of power that can be provided by a plurality of driving modules 120-1, ..., 120-n may correspond to a capacity of a plurality of power supplies included in each of a plurality of driving modules 120-1, ..., 120-n, i.e., a regular capacity (or regular output) of SMPS.

Specifically, the processor 140 may calculate the peak luminance level of each of a plurality of display modules 110-1, ..., 110-n based on a maximum power consumption among individual power consumptions of each of a plurality of display modules 110-1, ..., 110-n and a capacity that can be provided by each of a plurality of driving modules 120-1, ..., 120-n.

Specifically, the processor 140 may determine a maximum power amount of a reference display module having a maximum power consumption among a plurality of display modules 110-1, ..., 110-n, and calculate a power increase rate based on a power consumption and a maximum power amount of the reference display module.

For example, the power increase rate, Pr, may be calculated by dividing a maximum power amount of a reference display module by power consumption of the reference display module. Meanwhile, the maximum power amount of the reference display module may be the same as a capacity that can be provided by each of a plurality of driving modules 120-1, ..., 120-n, but not limited hereto.

Thereafter, the processor 140 may calculate the maximum power amount of the other display modules by applying the calculated power increase rate Pr to the power consumption of the other display modules. Thus, the maximum power amount of the other display modules may be calculated by multiplying power consumption of each display module by the power increase rate Pr.

For example, as illustrated in FIG. 3B, when the power consumptions of the first to fourth display modules 110-1 to 110-4 are respectively 60 W, 100 W, 70 W, 50 W and when the maximum power amount of the second display module 110-2, having a maximum power consumption of 100 W, is determined to be a regular capacity, 300 W, the power increase rate may be 3.

In this case, the processor 140 may apply the power increase rate 3 to the power consumption of the first, third, and fourth display modules 110-1, 110-3, 110-4 and determine the maximum power amount of the first, third, and fourth display modules 110-1, 110-3, 110-4 to be 60 W*3=180 W, 70 W*3=210 W, 50 W*3=150 W, respectively.

However, according to various exemplary embodiments, the power increase rate Pr may be applied with a preset weighted value $\alpha$. Further, the power increase rate applied to the other display modules may be applied with a different weighted value according to a power of each display module, and different power increase rates $Pr*\alpha_1$, $Pr*\alpha_2$, $Pr*\alpha_3$ may be calculated in each display module.

However, this is merely exemplary; a preset weighted value may be applied based on the power increase in the reference display module according to another exemplary embodiment, and the power amount applied with a weighted value may be determined as the increased power amount of the other display modules.

For example, the power increase of the second display module 110-2, 200 W, may be applied with a preset weighted value based on the power consumption of each display module. For example, the power increase applied with the weighted values, $\beta_1$, $\beta_2$, $\beta_3$, which are calculated based on the power consumptions 60 W, 70 W, 50 W in each of the first, third, and fourth display modules 110-1, 110-3, 110-4, i.e., 200 W*$\beta_1$, 200 W*$\beta_2$, 200 W*$\beta_3$ may be determined to be corresponding increased power amounts. In this case, the maximum power amounts in each of the first, third, and fourth display modules 110-1, 110-3, 110-4 may be 60 W+200 W*$\beta_1$, 70 W+200 W*$\beta_2$, 50 W+200 W*$\beta_3$.

Thereafter, the processor 140 may determine the peak luminance level of each of a plurality of display modules 110-1, ..., 110-n based on the maximum luminance level information of each power provided to the display module stored in the storage 130 and based on the maximum power amount of each of a plurality of display modules 110-1, ..., 110-n.

Figure 5:
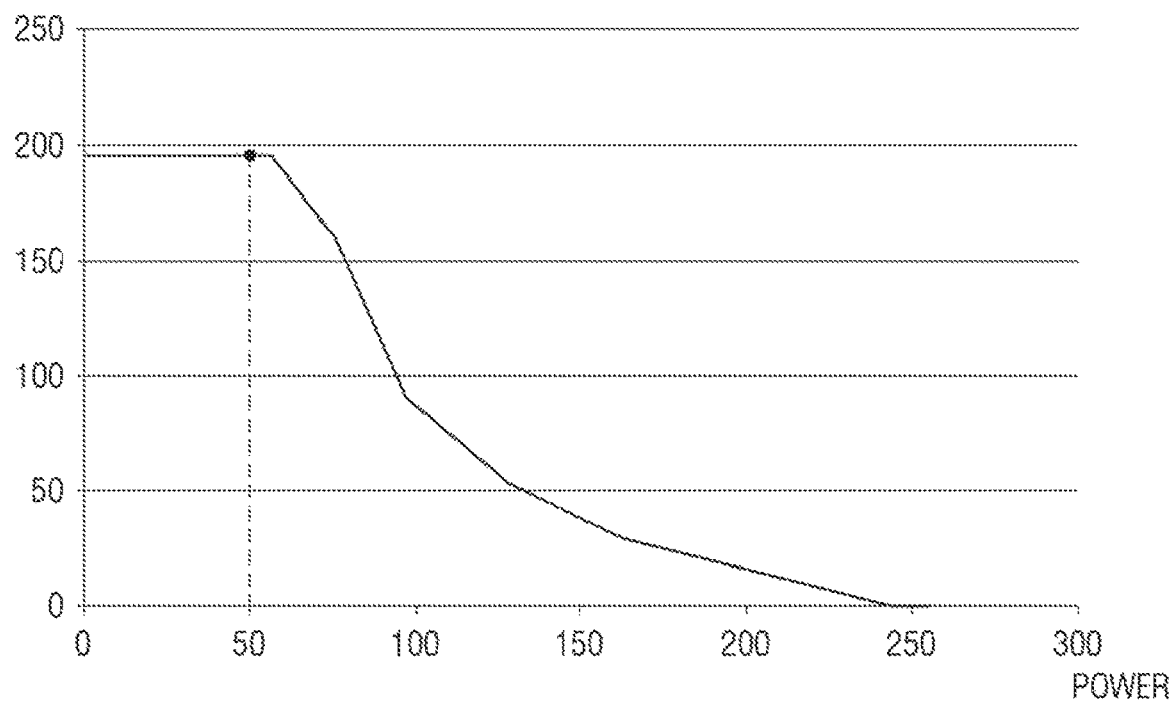
FIG. 5 is a diagram illustrating maximum luminance level increment information of each power provided to a display module according to an exemplary embodiment.

FIG. 5 is a diagram illustrating the maximum luminance level increment for each power provided to the display module according to an exemplary embodiment.

For example, the maximum luminance level increment for each power level may be shown in a drawing representing the luminance increase according to the power increase, as illustrated in FIG. 5. As the power increase rate increases, the luminance amount increasing with respect to a uniform power amount may gradually decrease, as illustrated. However, for the information that can be used according to an exemplary embodiment, any information representing relations between the supply power and the luminance can be applied, and not limited hereto.

The processor 140 may determine the peak luminance level of each of a plurality of display modules 110-1, ..., 110-n based on such information.

However, according to another exemplary embodiment, the reference peak luminance level of the reference display module having the maximum power consumption among a plurality of display modules 110-1, ..., 110-n may be calculated, and the peak luminance level of each of the other display modules may be calculated based on the calculated reference peak luminance level.

For example, as illustrated in FIG. 3B, when the power consumption of the first to fourth display modules 110-1 to 110-4 are respectively 60 W, 100 W, 70 W, 50 W, and when the maximum power amount of the second display module 110-2 having the maximum power consumption of 100 W is determined to be a regular capacity of 300 W, the peak luminance level of the second display module 110-2 may be calculated.

Thereafter, the processor 140 may calculate the peak luminance level of the first, third, and fourth display modules 110-1, 110-3, 110-4, based on the peak luminance level of the second display module 110-2. For example, when the peak luminance level of the second display module 110-2 is calculated to be A nits, and when the current luminance level is B nits, the luminance increase ratio A/B, calculated as discussed above, may be applied to the luminance level of the first, third, and fourth display modules 110-1, 110-3, 110-4. Thus, the peak luminance level of each of the first, third, and fourth display modules 110-1, 110-3, 110-4 may be calculated.

Meanwhile, the processor 140 may obtain current gain value of each sub pixel corresponding to each of a plurality of display modules 110-1, . . . , 110-n so that each of a plurality of display modules 110-1, . . . , 110-n has the calculated peak luminance level, and control a driving state of each of a plurality of driving modules 120-1, . . . , 120-n based on the obtained current gain values of each sub pixel.

In other words, the storage 130 may store the current gain information per luminance of each sub pixel constituting a plurality of display modules 110-1, . . . , 110-n.

Figure 6:
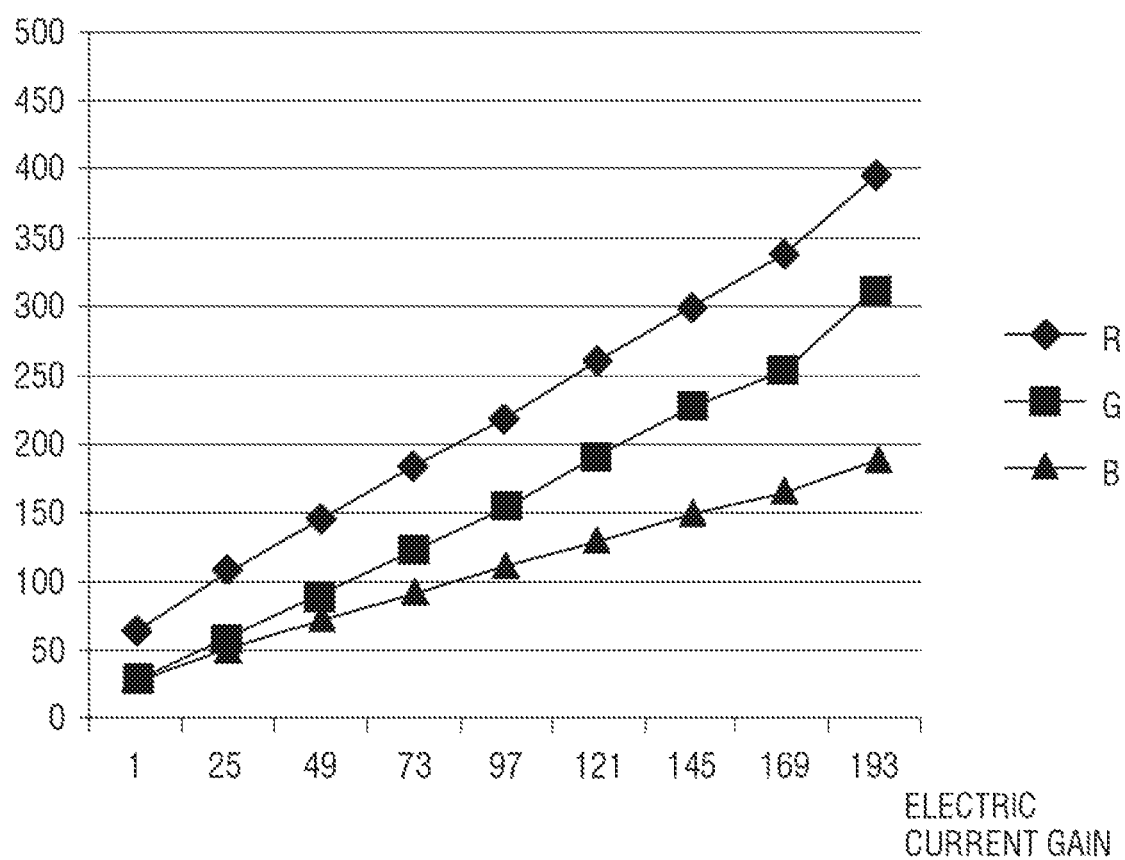
FIG. 6 is a diagram illustrating current gain information per luminance of each sub pixel according to an exemplary embodiment.

FIG. 6 is a diagram illustrating the current gain information per luminance of each sub pixel according to an exemplary embodiment.

Current gain information per luminance of each sub pixel, such as the information illustrated in FIG. 6, may include the current gain value per luminance of each sub pixel, which is calibrated based on the luminance and color properties of each sub pixel according to the current increase.

Figure 7:
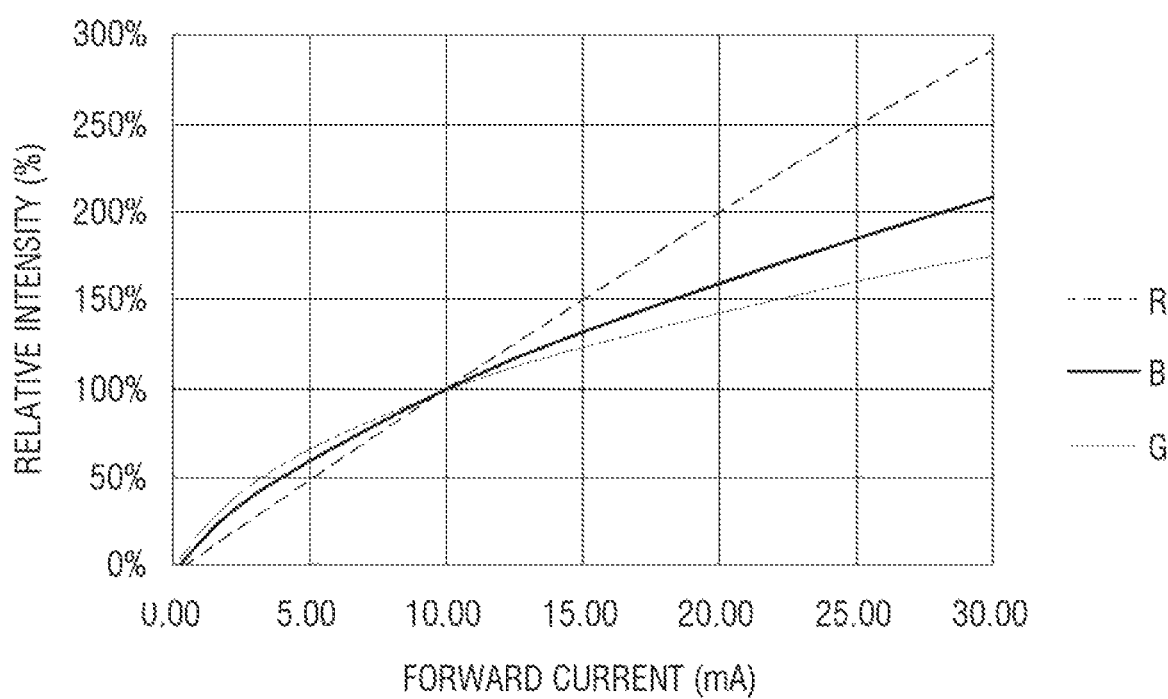
FIG. 7 is a diagram illustrating luminance characteristics of red, blue and green LED devices according to increase of a current for understanding of the present disclosure.
Figure 8A:
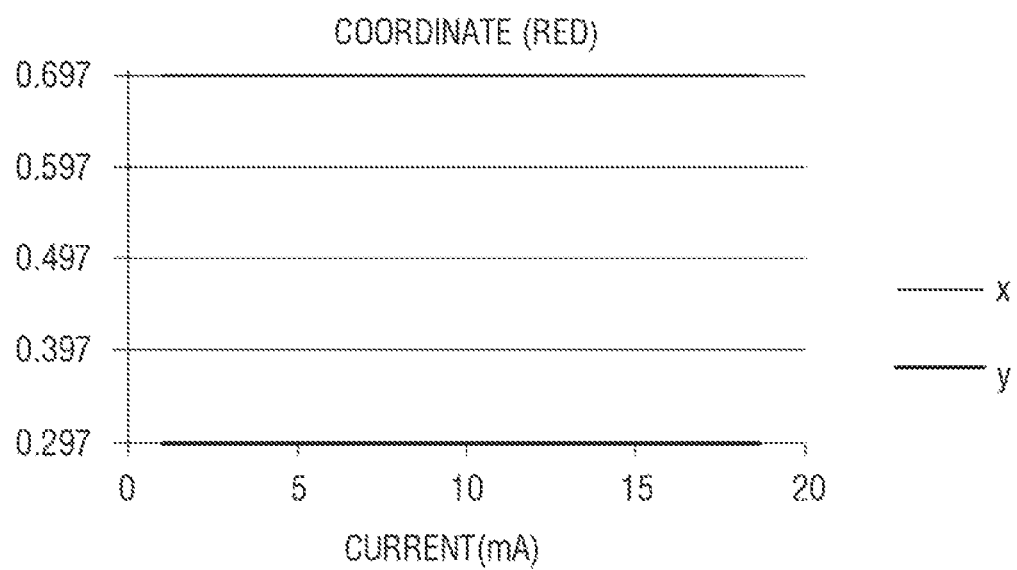
FIGS. 8A, 8B and 8C are diagrams describing color shift characteristics of red, blue and green LED devices according to increase of a current for understanding of the present disclosure.
Figure 8B:
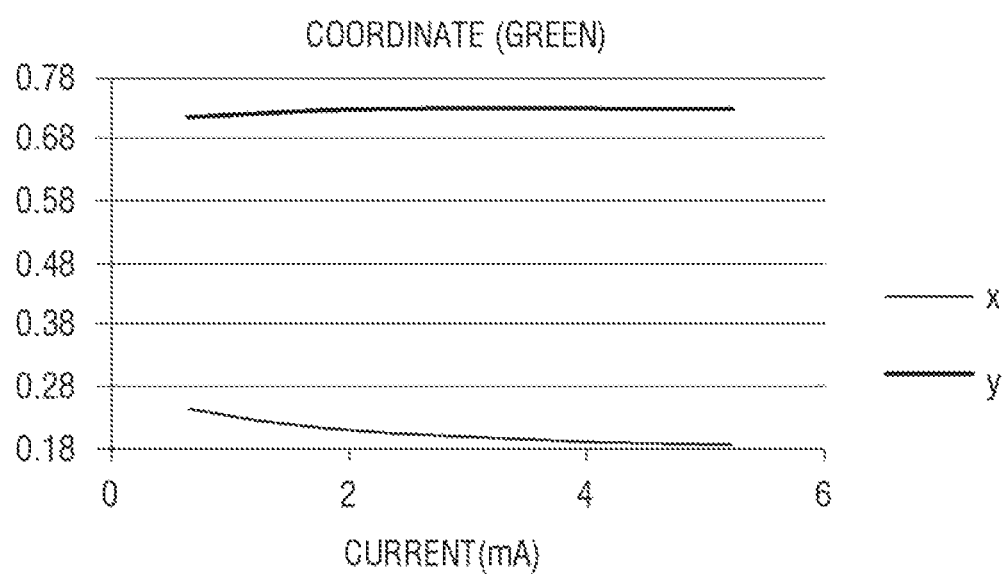

Specifically, as illustrated in FIG. 7, red, blue and green LED devices may have different luminance increase characteristics according to the current increase. Further, as illustrated in FIGS. 8A and 8B, red, blue and green LED devices may have different color shift characteristics because a color coordinate becomes different with different shapes according to the current increase. For example, as illustrated in FIG. 8A, a red LED device may keep a uniform value of x and y coordinates according to the current increase; however, it a green LED device may have slightly modified x, y coordinates, as illustrated in FIG. 8B, and blue LED devices may have considerably modified x, y coordinates according to the current increase, as illustrated in FIG. 8C.

Figure 8C:
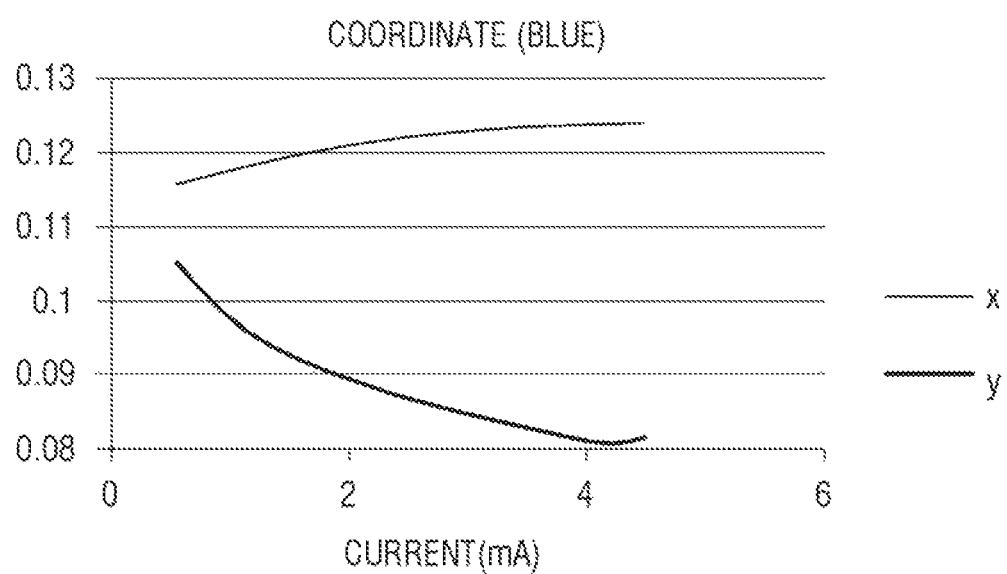

Thereby, the storage 130 may store the electrical gain values per luminance of each LED device, which are calculated by considering the luminance characteristic according to the current of each LED device as illustrated in FIG. 7, and the color property according to the current of each LED device as illustrated in FIGS. 8A, 8B and 8C. For example, the current gain information may include the current gain values divided by $2^8$ steps based on 8 bit information, but not limited hereto.

For example, the peak luminance level corresponding to the maximum power amount, 180 W, 300 W, 210 W, 150 W of each of the first to fourth display modules 110-1 to 110-4 may be respectively determined to be A, B, C, D, and the gain values of the current flowing in each LED device may be applied based on the graph of FIG. 6 with respect to a specific current value necessary for implementing each luminance level. In other words, a last current value applied with each of the current values a, b, c, d for implementing the peak luminance level of each of the first to fourth display modules 110-1 to 110-4 and the current gain values according to the characteristic of each LED device may be applied to the first to fourth display modules 110-1 to 110-4.

For example, gain values, $g_{r1}$, $g_{g1}$, $g_{b1}$, to drive each LED device of the first display module 110-1 may be respectively applied to the corresponding current value a, gain values, $g_{r2}$, $g_{g2}$, $g_{b2}$, to drive each LED device of the second display module 110-2 may be respectively applied to the corresponding current value b, gain values, $g_{r3}$, $g_{g3}$, $g_{b3}$, to drive each LED device of the third display module 110-3 may be respectively applied to the corresponding current value c, and gain values, $g_{r4}$, $g_{g4}$, $g_{b4}$, to drive each LED device of the fourth display module 110-4 may be respectively applied to the corresponding current values. Therefore, the luminance of the first to fourth display modules 110-1 to 110-4 may be controlled with the peak luminance level.

Figure 9:
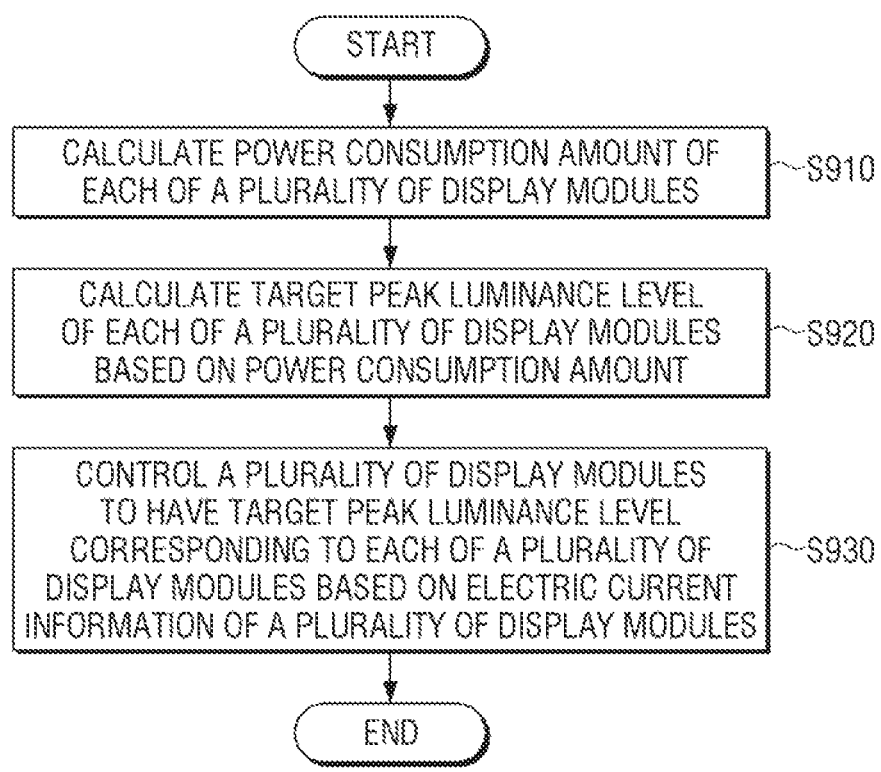
FIG. 9 is a flowchart describing a driving method of a display apparatus according to an exemplary embodiment.

FIG. 9 is a flowchart describing a driving method of the display apparatus according to an exemplary embodiment.

The display apparatus applied with the driving method according to an exemplary embodiment illustrated in FIG. 9 may include the display constituted with a plurality of display modules.

According to the driving method of the display apparatus illustrated in FIG. 9, the individual power consumptions of each of a plurality of display modules may be calculated at S910.

At S920, the peak luminance level of each of a plurality of display modules may be calculated based on the calculated power consumption.

At S930, a plurality of display modules may be driven to the peak luminance level corresponding to each of a plurality of display modules based on the current information of a plurality of display modules.

In this case, the current information may include the current control information according to the luminance of each sub pixel constituting the display module. Specifically, the current information may include the current control information (e.g., current gain value or current value) according to the luminance of each sub pixel which is calibrated based on the luminance characteristic and the color shift characteristic according to the current of each sub pixel. Meanwhile, the current information may be previously stored in the display apparatus or received from an external device (e.g., set-top box, user terminal, server and so on).

Meanwhile, at S920, the calculating the peak luminance level of each of a plurality of display modules may be based on the maximum power consumption of the individual power consumptions of each of a plurality of display modules and a capacity that can be provided by each of a plurality of driving modules.

Further, a processor may determine a power increase of the other display modules based on a power increase of the reference display module having the maximum power consumption among the individual power consumptions of each of a plurality of display modules, and calculate the peak luminance level of each display module based on the maximum power amount calculated regarding each display module and the luminance level information of each power provided to the display module. Herein, the luminance level information of each power provided to the display module may be previously stored in the display apparatus or received from an external device (e.g., set-top box, user terminal, server, and so on).

Further, at S920, a reference peak luminance level of the reference display module having the maximum power consumption among a plurality of display modules may be calculated based on the maximum luminance level information of each power, and the peak luminance level of each of the other display modules may be calculated based on the calculated reference peak luminance level.

Further, at S930, the current gain values of each sub pixel corresponding to each of a plurality of display modules, which allows each of a plurality of display modules to reach the calculated peak luminance level, may be obtained, and a plurality of display modules may be respectively driven based on the obtained current gain values of each sub pixel.

Further, at S910, the individual power consumptions of each of a plurality of display modules may be calculated based on a gray scale value of an image displayed on each of a plurality of display modules and the power information of each sub pixel per gray scale. The power information of each sub pixel per gray scale of an image may be previously stored in the display apparatus or received from an external device (e.g., set-top box, user terminal, server, and so on).

Meanwhile, a plurality of display modules may be implemented as an LED cabinet including a plurality of LED devices, and each sub pixel may be implemented as one among red, green and blue sub pixels.

According to the various exemplary embodiments of the present disclosure, because the color shift phenomenon according to the increase of the current inputted to each sub pixel may be prevented, the screen quality provided to a user may be enhanced. Thus, contrast of a low gray scale image may be maximized without a color shift, and the consumed electrical power of a high gray scale image may be reduced.

Meanwhile, the methods according to the various exemplary embodiments of the present disclosure may be implemented by a software/hardware upgrade of a display apparatus.

Further, there may be provided non-transitory computer readable recording medium storing a program for consecutively performing the driving method according to an exemplary embodiment.

The non-transitory computer readable recording medium indicate medium which store data semi-permanently and can be read by machine, rather than medium for storing data temporarily, such as register, cache, or memory. Specifically, the various applications or programs described above may be stored and provided in non-transitory computer readable recording medium such as a CD, DVD, hard disk, Blu-ray disk, USB, memory card, or ROM.

The foregoing exemplary embodiments and advantages are merely exemplary and are not to be construed as limiting. The present teaching can be readily applied to other types of apparatuses. Also, the description of the exemplary embodiments is intended to be illustrative, and not to limit the scope of the claims.

What is claimed is:

1. A display apparatus, comprising:
 a display comprising a plurality of display modules, the plurality of display modules comprising;
 one or more display drivers; and
 a processor configured to:
  identify a power consumption corresponding to each of the plurality of display modules;
  identify a maximum power consumption from among a plurality of power consumptions respectively corresponding to each of the plurality of display modules;
  identify a reference display module consuming the maximum power consumption;
  identify a power increase rate by dividing a maximum power amount of the reference display module by the power consumption of the reference display module;
  identify current information corresponding to each of the plurality of display modules based on the power increase rate and luminance information of an input image; and
  control the one or more display drivers to control an input current to each of the plurality of display modules based on the identified current information for each of the plurality of display modules,
 wherein each of the plurality of display modules comprises light emitting diode (LED) pixels, and
 wherein the current information comprises current control information according to luminance of each of the LED pixels of the plurality of display modules.

2. The display apparatus of claim 1, wherein the current information comprises information calibrated based on a luminance characteristic and a color shift characteristic of each pixel included in the plurality of display modules.

3. The display apparatus of claim 2, wherein the processor is further configured to:
 obtain, from a storage, a current gain value of each LED pixels of the plurality of display modules, and
 control the one or more display drivers to control the input current to each of the plurality of display modules based on the obtained current gain value.

4. The display apparatus of claim 1, wherein the processor is further configured to:
 identify the power consumption based on the input image and the current information according to luminance of light emitting diode (LED) pixels, and
 control the one or more display drivers to control the input current to each of the plurality of display modules based on the identified power consumption of each of the plurality of display modules to display the input image using the plurality of display modules.

5. The display apparatus of claim 4, further comprising a storage storing the current information of each pixel included in the plurality of display modules,
 wherein the processor is further configured to control the one or more display drivers to control the input current based on each of the power consumption and the current information obtained from the storage.

6. The display apparatus of claim 4, the processor further configured to:
 identify a peak luminance level of each of the plurality of display modules based on each of the power consumption; and
 control the one or more display drivers to control the input current based on the peak luminance level.

7. The display apparatus of claim 1, wherein a storage further stores power information of each light emitting diode (LED) pixels per gray scale of the input image, and
 the processor is further configured to:
  calculate the power consumption of each of the plurality of display modules based on a gray scale value of the input image displayed on each of the plurality of display modules and the power information of each LED pixels per gray scale; and
  control the one or more display drivers to control the input current to each of the plurality of display modules based on the calculated the power consumption.

8. The display apparatus of claim 1, wherein each of the plurality of display modules is a light emitting diode (LED) cabinet comprising a plurality of LED pixels, the plurality of LED pixels comprising a red LED, a green LED and a blue LED.

9. The display apparatus of claim 1, wherein the one or more display drivers comprises a plurality of driving modules which are connected to the plurality of display modules, respectively.

10. The display apparatus of claim 1, wherein the processor is further configured to:
 calculate a modified power amount corresponding to each of the plurality of display modules by multiplying the power consumption corresponding to each of the plurality of display modules and the power increase rate, and identify the current information corresponding to each of the plurality of display modules based on the modified power amount corresponding to each of the plurality of display modules.

11. A method for controlling a display apparatus including a display comprising a plurality of display modules and one or more display drivers, the method comprising:
identifying a plurality of power consumptions respectively corresponding to the plurality of display modules;
identifying a maximum power consumption from among the plurality of power consumptions respectively corresponding to each of the plurality of display modules;
identifying a reference display module consuming the maximum power consumption;
identifying current information corresponding to each of the plurality of display modules based on the maximum power consumption of the reference display module and luminance information of an input image; and
controlling an input current to each of the plurality of display modules based on the identified current information for each of the plurality of display modules,
wherein each of the plurality of display modules comprises light emitting diode (LED) pixels, and
wherein the current information comprises current control information according to luminance of each of the LED pixels of the plurality of display modules.

12. The method of claim 11, wherein the current information comprises information calibrated based on a luminance characteristic and a color shift characteristic of each pixel included in the plurality of display modules.

13. The method of claim 12, further comprising:
obtaining a current gain value of each LED pixels of the plurality of display modules, and
controlling the input current to each of the plurality of display modules based on the obtained current gain value.

14. The method of claim 11, further comprising:
identifying the power consumption based on the input image and the current information according to luminance of light emitting diode (LED) pixels, and
controlling the input current to each of the plurality of display modules based on the identified power consumption of each of the plurality of display modules to display the input image using the plurality of display modules.

15. The method of claim 14, further comprising:
controlling the input current based on each of the power consumption and the current information of each pixel included in the plurality of display modules.

16. The method of claim 14, further comprising:
identifying a peak luminance level of each of the plurality of display modules based on each of the power consumption; and
controlling the input current based on the peak luminance level.

17. The method of claim 11, further comprising:
calculating the power consumption of each of the plurality of display modules based on a gray scale value of the input image displayed on each of the plurality of display modules and a power information of each light emitting diode (LED) pixels per gray scale of the input image; and
controlling the input current to each of the plurality of display modules based on the calculated the power consumption.

18. The method of claim 11, wherein each of the plurality of display modules is a light emitting diode (LED) cabinet comprising a plurality of LED pixels, the plurality of LED pixels comprising a red LED, a green LED and a blue LED.

19. The method of claim 11, wherein the one or more display drivers comprises a plurality of driving modules which are connected to the plurality of display modules, respectively.

* * * * *